United States Patent [19]
Clark

[11] 3,842,933
[45] Oct. 22, 1974

[54] AERIAL PLATFORM

[76] Inventor: Albert L. Clark, Rt. 4, West Bend, Wis. 53095

[22] Filed: June 8, 1973

[21] Appl. No.: 368,436

Related U.S. Application Data

[63] Continuation-in-part of Ser. No. 147,396, May 27, 1971, abandoned.

[52] U.S. Cl. ................................................ 182/2
[51] Int. Cl. .......................................... B66f 11/04
[58] Field of Search .................... 182/2, 141, 148

[56] References Cited
UNITED STATES PATENTS

| | | | |
|---|---|---|---|
| 2,724,620 | 11/1955 | Johnson | 182/2 |
| 3,204,720 | 9/1965 | Eitel | 182/2 |
| 3,252,542 | 5/1966 | Trump | 182/2 |
| 3,483,948 | 12/1969 | Trump | 182/2 |

FOREIGN PATENTS OR APPLICATIONS

| 243,837 | 3/1963 | Australia | 182/2 |
|---|---|---|---|

Primary Examiner—Reinaldo P. Machado
Attorney, Agent, or Firm—Wheeler, Morsell, House & Fuller

[57] ABSTRACT

The disclosure pertains to a vertically moveable aerial platform which may be mounted on a pick up truck or similar vehicle. The platform linkage is a four bar open linkage in which the floating link extends backwardly and carries a platform which is pivotally connected at the rear end of the link. When the linkage is in the collapsed position, the horizontal portion of the platform may be pivoted upwardly to provide a tail gate for the truck and the follower link is partially folded via a hinge to permit the main structure to extend over the cab of the truck. As the platform is raised, the floating link rotates downwardly around its pivotal connection to the driver link thereby elevating the platform. The platform is connected to the driver link via a chain which, during movement of the linkage, serves to maintain the platform in a horizontal position.

6 Claims, 2 Drawing Figures

PATENTED OCT 22 1974

3,842,933

Inventor
Albert L. Clark
By Andrew Weston
Attorney 3,842,933

AERIAL PLATFORM

This is a continuation in part of application Ser. No. 147,396, filed May 27, 1971, now abandoned.

BACKGROUND OF THE INVENTION

This invention pertains to vertically moveable aerial platforms as generally found in class 182-2 in the records of the U.S. Pat. Office.

The field of the invention pertains to features which permit work platforms to be nested with the truck in which they are mounted.

SUMMARY OF THE INVENTION

The principle object of this invention is to provide an aerial platform, which when in the collapsed position, nests with the truck and thus provides a minimum height, and which further permits maximum utilization of the free space on the truck deck. Another object of the present invention is to utilize a portion of the platform as the tail gate of the truck. These objects are attained by utilizing an open four bar linkage, on which the platform is mounted.

DESCRIPTION OF PREFERRED EMBODIMENT

Figure 1:
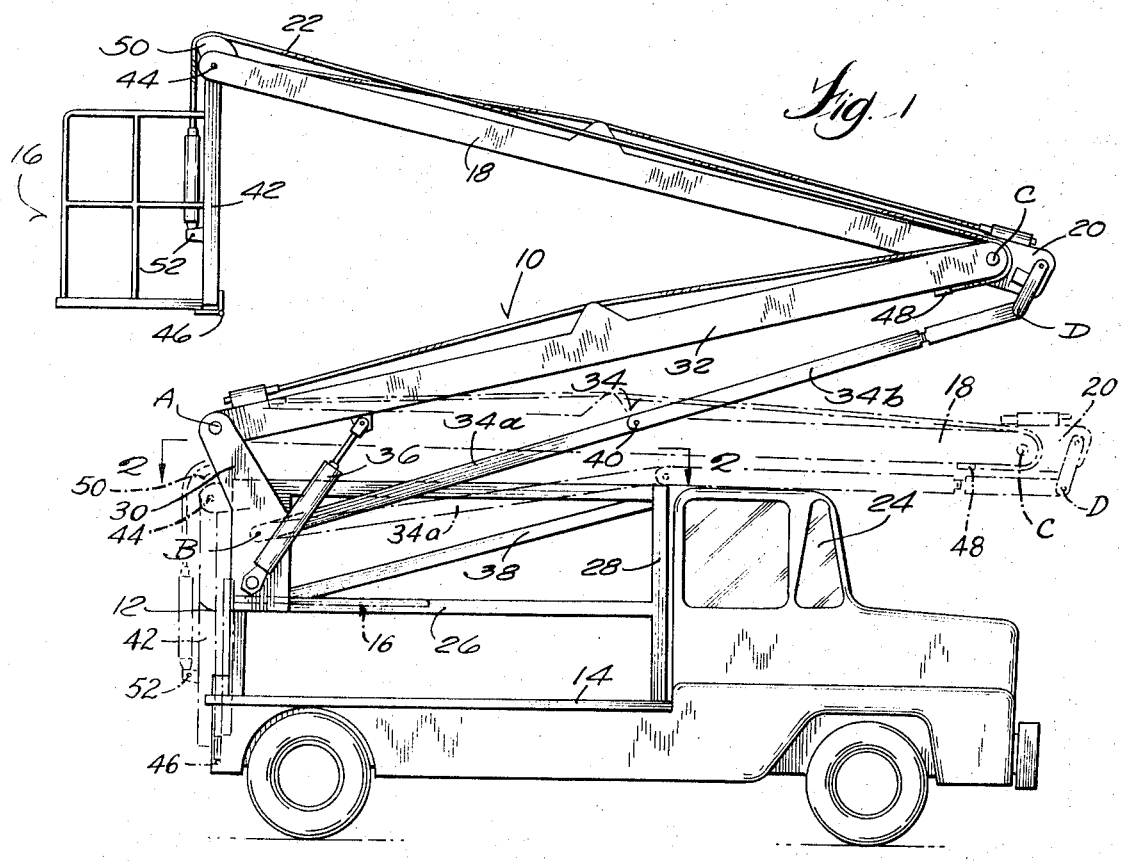
FIG. 1 is a side veiw of the invention.
Figure 2:
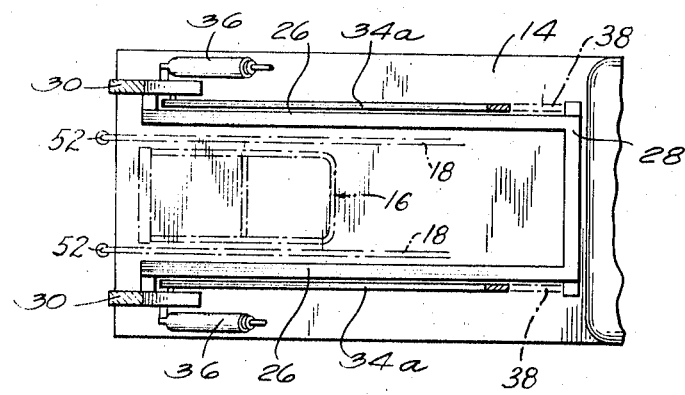
FIG. 2 is a top view taken along line 2—2.

The aerial platform is comprised of a hydraulically actuated four bar linkage 10, the frame 12 of which is fixed to the deck 14 of the pick up truck, and a platform portion 16 which is mounted on the rearwardly extending lever section 18 of the floating link 20 of the linkage. The platform section is maintained generally horizontal throughout movement of the linkage by a cable 22 which permits the platform 16 to pivot in respect to the lever section 18 as the latter moves upwardly. When the linkage is in the collapsed position, a portion of it extends above the cab 24 of the truck. The platform portion 16 may be pivoted from the generally horizontal position to an upstanding position to thereby serve as the tail gate for the truck.

The frame 12 is comprised of fore and aft extending side sections 26 located at each side of the truck deck and connected at their front end by a cross section 28. Each side section carries a generally upstanding support member 30 which carries the other oomponents of the linkage. The frame fits on the deck of the truck, yet leaves a fairly ample space in the center of the deck for the carriage of tools, materials or another type of load.

The four bar linkage is comprised of the frame 12, a driver link 32, limited length means or a follower link 34, both of which are pivotally connected to the support members 30 at axes A and B respectively. The driver and follower links are pivotally connected at axes C and D respectively to the floating link 18. Each of the links are of an open-frame rectangular construction having two identical side members which are interconnected by cross members at the pivot points of the links and which are further strengthened by diagonally extending braces. The limited length means or follower link 34 can comprise link portions 34a and 34b which are hinged together at their adjacent ends, or alternatively, can be in the form of a flexible member such as a cable.

The driver link is powered by two hydraulic cylinders 36, each of which is pivotally connected at its lower end to one of the support members 30 and pivotally connected at its upper end to the corresponding side member of the driver link 32. The cylinders are identical and are part of a hydraulic circuit which permits their simultaneous and equal actuation. Since circuits of this type are well known, the circuit is not disclosed herein.

When the cylinders 36 are in their retracted position, the linkage is collapsed. In this position, the driver link and the lever section 18 are in a generally horizontal position. The follower link 34 is partially collapsed, with its lower portion 34a resting on the diagonal braces 38 of the frame side sections 26 and with its upper portion 34b being generally horizontal and extending over the truck cab. The two follower link sections are connected by a hinge 40 (each side member of the sections having a separate hinge).

As the cylinders 36 are extended from their retracted position, the driver link pivots upwardly around axis A. Since the lever section 18 of the floater link rests on the driver link, it will be carried during the initial movement of the cylinders by the driver link. During this initial movement, the collapsed follower link will unfold, with link section 34a remaining stationary and in its resting position on braces 38, and with link section 34b pivoting upwardly around hinge 40. After the link section 34b moves to a position in alignment with link section 34a, the follower link becomes loaded in tension and, upon further extension of the cylinders, pivots around axis B.

The driver and follower links are non-parallel and the upward movement of the driver link around axis A causes the follower link to be loaded in tension and to pivot the floating link in a clockwise direction (as shown in the drawings) around axis C. Thus, the floating link portion between axes C and D pivots downwardly and around axis C whereas the lever portion 18 of the floating link pivots upwardly in respect to axis C.

The platform 16 has an upwardly extending support frame 42 which is pivotally connected at 44 to the back end of the lever section 18. The platform is connected to the support frame 42 by a hinge 46 which permits the platform to be pivoted between the horizontal position in which support is provided to workmen or materials and a generally upstanding position. When the linkage is in a collapsed position, the platform frame section 42 is adjacent to the rear edge of the truck deck 14 and hinge 46 is generally at the level of the deck. When in this position, the platform 16 may be pivoted upwardly to thus form the tail gate for the truck.

A cable 22 connects the driver link 32 with the support frame 42 of the platform and serves to maintain the platform 16 in a generally horizontal position throughout the movement of the linkage. The cable is fixed at point 48 to each side member of the driver link 32, and is partially wrapped around the rounded end of each side member of the link. The cable extends around a similarly partially rounded end 50 of the frame member 42 and is fixed to the frame member at point 52. The partially rounded end 50 of the frame member 42 extends above pivot point 44 as shown in the drawings. As the linkage is expanded, point 44 rotates in a counterclockwise direction (as shown in the drawings) in respect to the floating link 22, thereby releasing a corresponding cable portion which permits the platform 16 to rotate, by force of gravity, in the counterclockwise direction around axis 44. Thus, as the linkage is expanded, the amount of cable which is wrapped around the rounded end of link 32 is decreased and the amount of cable which is wrapped around the upwardly extending portion 50 of frame 42 is correspondingly increased. Thus, the platform 16 remains generally horizontal throughout the movement of the linkage. As the linkage is moved from an open position to a collapsed position, the amount of cable which is wrapped around the rounded end of link 32 is increased and the amount of wrap around end 50 of the platform frame is correspondingly decreased, thus again maintaining the platform horizontal.

I claim:

1. An aerial platform adapted to be mounted on the chassis of a vehicle, comprising
   a. four bar linkage including:
      i. a frame adapted to be fixed to the chassis;
      ii. a driver link pivotally connected at its lower end to said frame;
      iii. limited length means positioned below said driver link and pivotally connected at its lower end to said frame at a point spaced from said pivotal connection of said driving link to the frame;

iv. a floating link pivotally connected to the upper ends of said driver link and said limited length means so that, upon upward movement of said driver link and said limited length means, a forward portion of said floating link pivots downwardly in respect to its connection to said driver link;
   b. said floating link having an extended lever section, which extends beyond the connection between said floating link and said driver link and, which pivots upwardly in respect to said driver link as the driver link and said limited length means are moved upwardly;
   c. platform means connected to said extending lever section;
   d. hydraulic cylinder means connected between said frame and said driver link and adapted to move said linkage between a collapsed position in which said platform means is at its lower most position and an expanded position in which said platform means is moved above said upper ends of said driver link and said limited length means and wherein said platform means is pivotally connected to said lever section, and including means for maintaining said platform section generally horizontal during movement of said linkage, said means including an elongated member with flexible portions having one end connected to said platform, said elongated member extending along said floating link, and the other end of said elongated member being wrapped around the end of said driver link and connected to said driver link.

2. An aerial platform adapted to be mounted on the chassis of a vehicle, comprising
   a. four bar linkage including:
      i. a frame adapted to be fixed to the chassis;
      ii. a driver link pivotally connected at its lower end to said frame;
      iii. limited length means positioned below said driver link and pivotally connected at its lower end to said frame at a point spaced from said pivotal connection of said driving link to the frame;

iv. a floating link pivotally connected to the upper ends of said driver link and said limited length means so that, upon upward movement of said driver link and said limited length means, a forward portion of said floating link pivots downwardly in respect to its connection to said driver link;
   b. said floating link having an extended lever section, which extends beyond the connection between said floating link and said driver link and, which pivots upwardly in respect to said driver link as the driver link and said limited length means are moved upwardly;
   c. platform means connected to said extending lever section;
   d. hydraulic cylinder means connected between said frame and said driver link and adapted to move said linkage between a collapsed position in which said platform means is at its lower most position and an expanded position in which said platform means is moved above said upper ends of said driver link and said limited length means and wherein said platform means is comprised of a normally horizontal platform section and an upstanding frame section, said upstanding frame section being pivotally connected to said floating link lever section and having a portion projecting above the point of connection to said lever section; and
   elongated means with flexible portions being fixed to and partially wrapped around the upper ends of said driver link and connected to said upstanding frame section, a portion of said elongated means being unwrapped as said driver link is moved upwardly thereby permitting said platform section to pivot in respect to said floating link lever section to a degree sufficient to retain said platform means generally horizontal throughout the movement of said linkage.

3. An aerial platform adapted to be mounted on the chassis of a vehicle, comprising
   a. a linkage including:
      i. a frame adapted to be fixed to the chassis;
      ii. a driver link pivotally connected at its lower end to said frame;
      iii. a floating link pivotally connected to the upper ends of said driver link;
   b. said floating link having an extended lever section, which extends beyond the connection between said floating link and said driver link and, which pivots upwardly in respect to said driver link as the driver link is moved upwardly;
   c. platform means connected to said floating link; and
   d. means adapted to move said linkage between a collapsed position in which said platform means is at its lower most position and an expanded position in which said platform means is moved above said upper end of said driver link, said platform means including a normally horizontal platform section and an upstanding frame section and wherein said platform section is pivotally connected to said upstanding frame section, and wherein said platform section, when said linkage is collapsed, may be pivoted from a generally horizontal position to a vertical position to thereby form the tail gate for the vehicle on which the aerial platform is adapted to be mounted.

4. An aerial platform adapted to be mounted on the chassis of a vehicle, comprising
   a. four bar linkage including:
      i. a frame adapted to be fixed to the chassis;
      ii. a driver link pivotally connected at its lower end to said frame;
      iii. limited length means positioned below said driver link and pivotally connected at its lower end to said frame;
      iv. a floating link pivotally connected to the upper ends of said driver link and said limited length means so that, upon upward movement of said driver link and said limited length means, said floating link pivots downwardly in respect to its connection to said driver link;
   b. said floating link having an extended lever section, which extends beyond the connection between said floating link and said driver link and, which pivots upwardly in respect to said driver link as the driver link and said limited length means are moved upwardly;
   c. platform means connected to said extending lever section; and
   d. means adapted to move said linkage between a collapsed position in which said platform means is at its lower most position and an expanded position in which said platform means is moved above said upper ends of said driver link and said limited length means and wherein said frame is adapted to be mounted on a deck of a truck so that said pivotal connection between said frame and said driver link and said limited length means is located generally adjacent the rear edge of such deck; and so that said driver link and said limited length means extend towards and over the cab of the truck when said linkage is in said collapsed position; said limited length means being comprised of a lower section and an upper section which are pivotally connected to each other, and said frame including stop means which stops the downward pivotal movement of said lower section as said linkage is moved from a partially expanded position to a collapsed position, yet permits said upper section to pivot as said linkage is moved to a fully collapsed position.

5. An aerial platform according to claim 4 wherein said platform means is comprised of a generally horizontally extending platform section which, when said linkage is in said collapsed position, is located adjacent the rear edge of the truck's deck; and including hinge means for said platform section to thereby permit said platform section to be pivoted to a vertical position so that it may serve as the tail gate of the truck.

6. In combination, a vehicle having a cab and deck with side walls and an aerial platform comprising a frame adapted to nest within said side walls, said frame including linkage support members located adjacent the rear of the deck, a linkage including a driver link having a first end pivotally connected to said linkage support members and a second end, a floating link having a first end pivotally connected to said second end of said driver link, with said floating link extending rearwardly from said pivotal connection with said driver link, a platform pivotally connected and suspended from a second end of said floating link, limited length means including first and second portions with adjacent ends of said portions commonly connected, said first portion being pivotally connected to said linkage support members, and said second portion being pivotally connected to said floating link forwardly of the pivotal connection of said connection of said driver link and said limited length means, hydraulic cylinder means having one end connected to said linkage support member and the other end connected to said driver link to raise and lower said linkage from a collapsed position with said platform adjacent the linkage support members, and said second portion of said limited length means extending generally horizontally at a height to provide clearance over said vehicle cab and with said first portion inclined at an angle with respect to the horizontal and resting on the frame, and said hydraulic cylinder means affording movement of said linkage to an elevated unfolded position with said platform raised above said support members.

* * * * *